United States Patent
Tang et al.

(10) Patent No.: US 8,405,614 B2
(45) Date of Patent: Mar. 26, 2013

(54) AMBIDEXTROUS COMPUTER MOUSE

(75) Inventors: Yu-Hao Tang, Shenzhen (CN);
Xian-Wei Ma, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 418 days.

(21) Appl. No.: 12/758,735

(22) Filed: Apr. 12, 2010

(65) Prior Publication Data
US 2011/0063221 A1    Mar. 17, 2011

(30) Foreign Application Priority Data
Sep. 15, 2009    (CN) .......................... 2009 1 0307000

(51) Int. Cl.
*G09G 5/08*  (2006.01)
(52) U.S. Cl. .................................................... 345/166
(58) Field of Classification Search ........... 345/163–166
See application file for complete search history.

(56) References Cited

U.S. PATENT DOCUMENTS
2008/0297478 A1 * 12/2008 Hotelling et al. ............. 345/163

FOREIGN PATENT DOCUMENTS
| CN | 201222232 Y | 4/2009 |
| TW | M314384 | 6/2007 |
| TW | 200911075 | 3/2009 |

* cited by examiner

*Primary Examiner* — Chanh Nguyen
*Assistant Examiner* — Allison Walthall
(74) *Attorney, Agent, or Firm* — Altis Law Group, Inc.

(57) ABSTRACT

A computer mouse includes a housing; a sliding plate is slidably connected to the housing; a first sub-switch and a second sub-switch arranged within the housing; a first operating portion mounted on one end of the computer mouse; a second operating portion mounted on an opposite end of the computer mouse; an image sensor configured for capturing images; a processing unit arranged within the housing; wherein, the first operating portion and the processing unit are connected to the first sub-switch, the second operating portion and the processing unit are connected to the second sub-switch, when the sliding plate sliding to one of two ends of the housing, actuating the one of the two sub-switches respectively.

9 Claims, 8 Drawing Sheets

AMBIDEXTROUS COMPUTER MOUSE

BACKGROUND

1. Technical Field

The present disclosure relates to computer peripherals, particularly to a ambidextrous computer mouse.

2. Description of Related Art

Generally, a computer mouse can be used in right hand mode or left hand mode. When it is not convenient for a user to manipulate the computer mouse with his/her right hand, he/she has to change settings on the computer to adapt the computer mouse for left handed use. It can be troublesome and inconvenient to reconfigure the operating system.

BRIEF DESCRIPTION OF THE DRAWINGS

The components of the drawings are not necessarily drawn to scale, the emphasis instead being placed upon clearly illustrating the principles of a computer mouse. Moreover, in the drawings, like reference numerals designate corresponding parts throughout several views.

DETAILED DESCRIPTION

Figure 1:
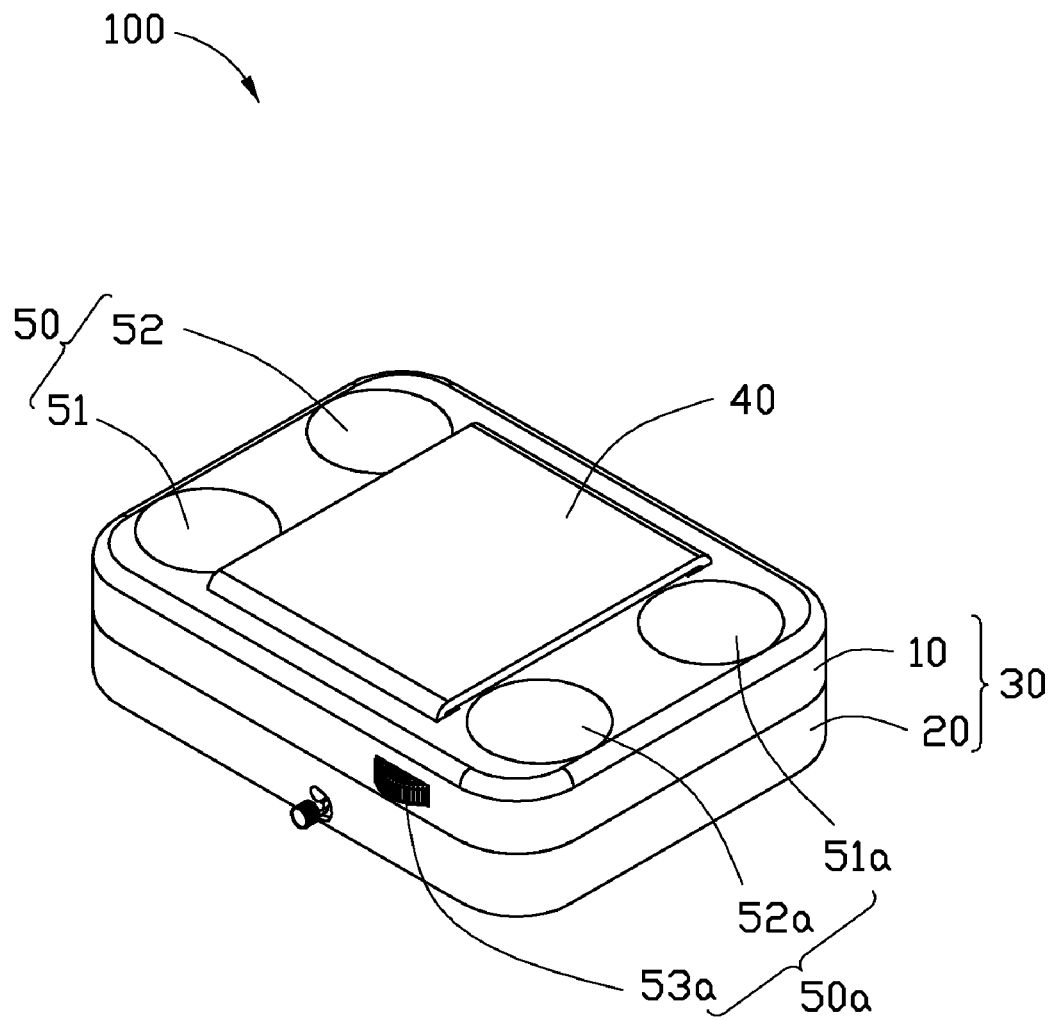
FIG. 1 is an isometric view of a computer mouse in accordance with an exemplary embodiment.

Referring to FIG. 1, an exemplary embodiment of a computer mouse 100 is illustrated. The computer mouse 100 includes a cover 10 and a base 20. The cover 10 cooperates with the base 20 to form a housing 30. A sliding plate 40 is slidably connected to the cover 10.

Figure 2:
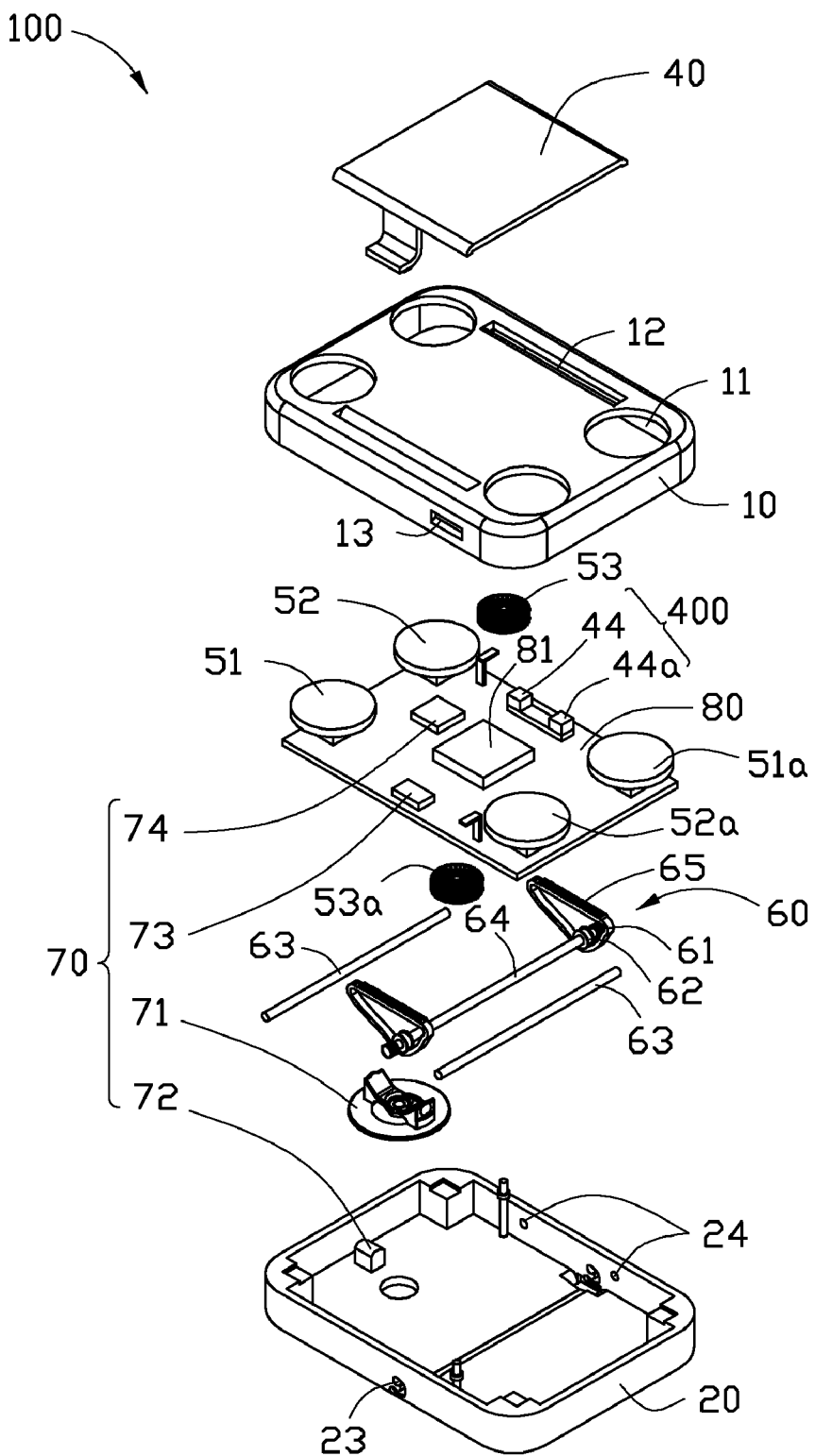
FIG. 2 is an exploded, perspective view of the computer mouse of FIG. 1.
Figure 3:
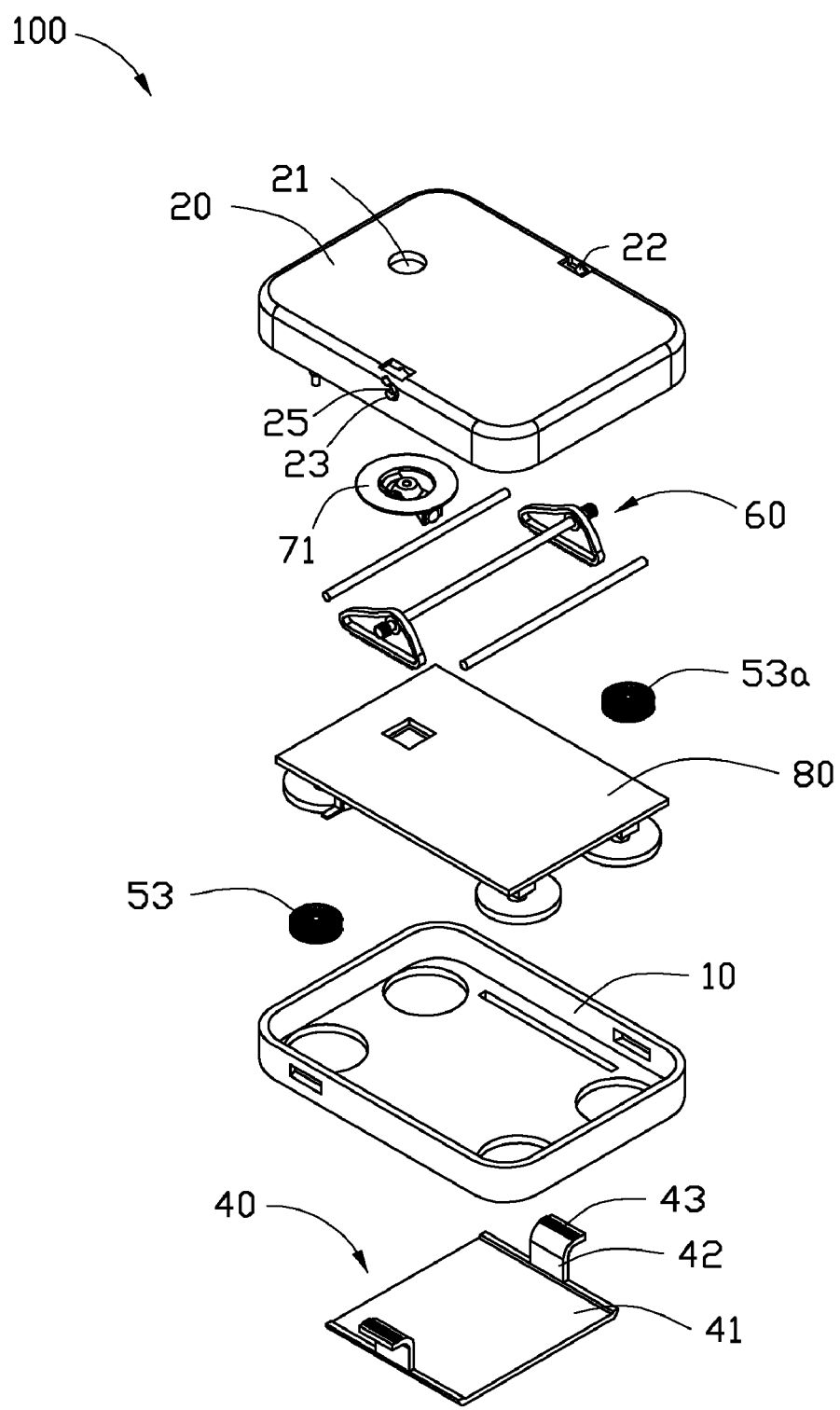
FIG. 3 is an exploded, perspective view of the computer mouse of FIG. 1, but viewed from a reversed perspective.
Figure 4:
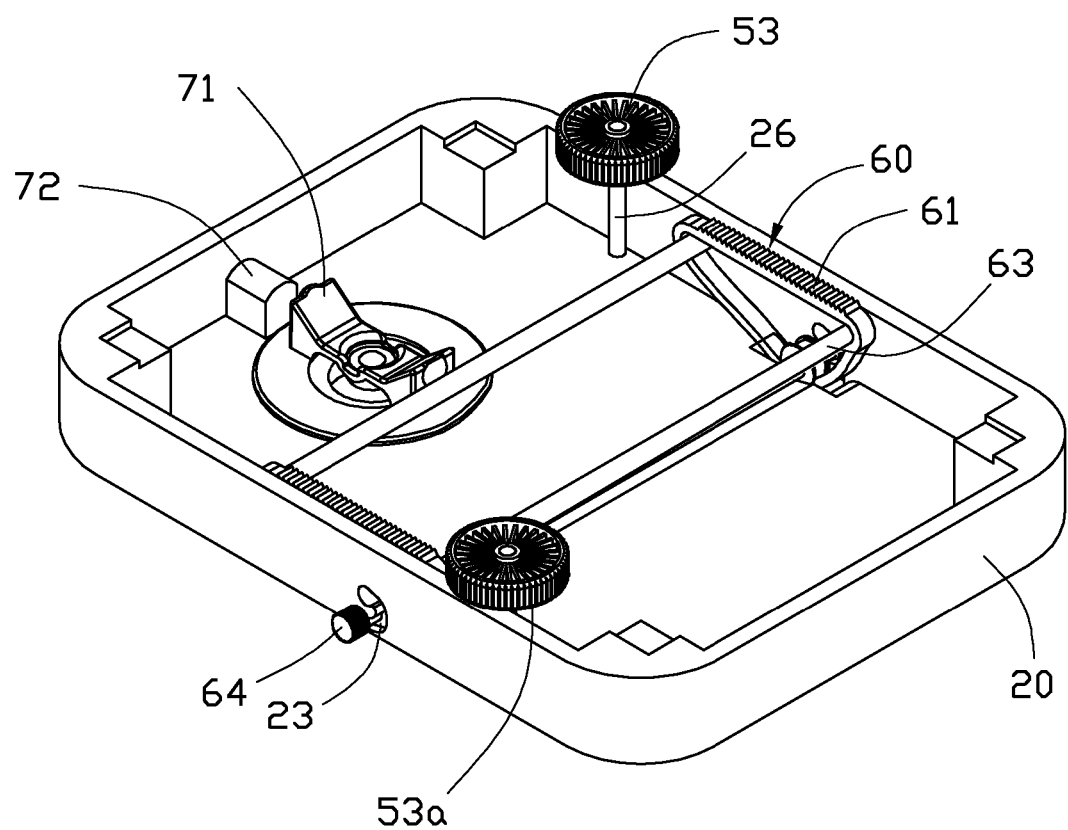
FIGS. 4-5 are isometric views of the computer mouse of FIG. 1 with certain components omitted for clarity.
Figure 5:
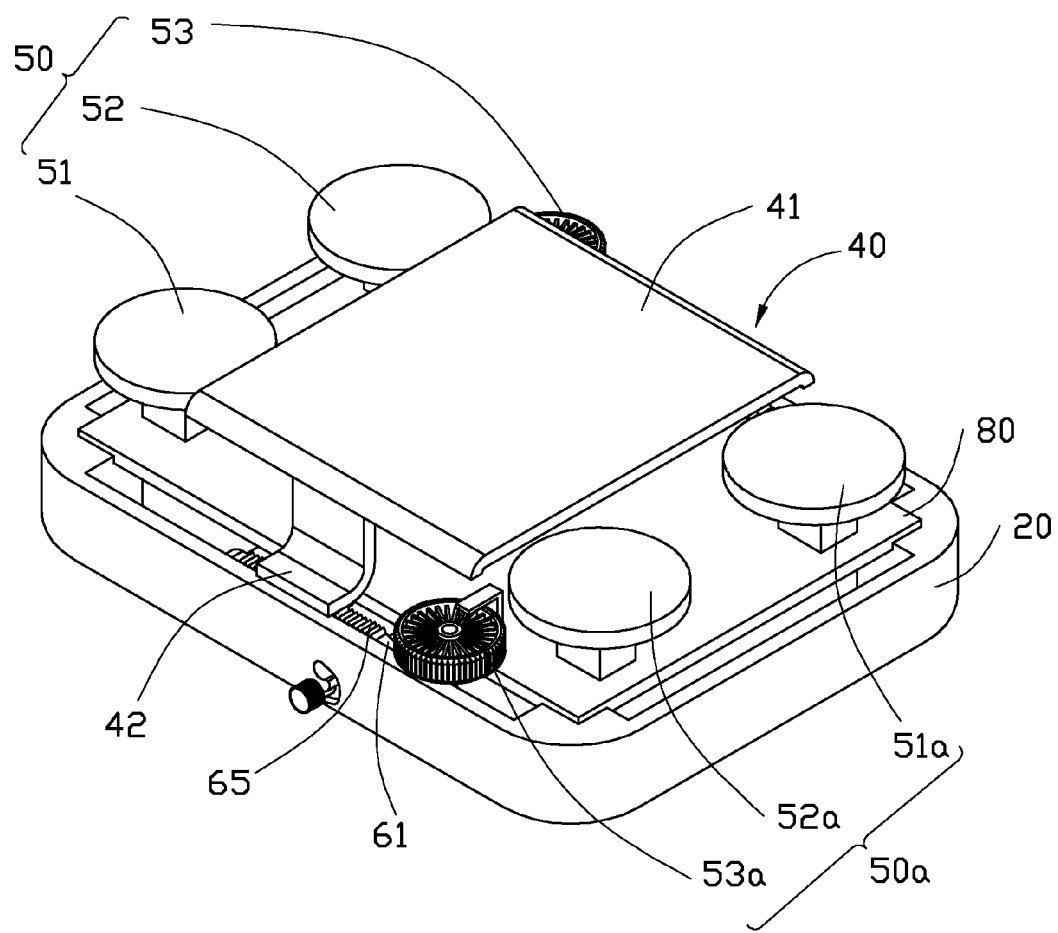

One end of the computer mouse 100 includes a first operating portion 50, and the opposite end includes a second operating portion 50a. In the embodiment, the first operating portion 50 includes a first left button 51, a first right button 52, and a first wheel 53 (shown in FIG. 2). The second operating portion 50a includes a second left button 51a, a second right button 52a, and a second wheel 53a.

Referring to FIGS. 2-5, the sliding plate 40 is used to actuate a two-way switch 400 to switch the computer mouse 100 between a left hand mode and a right hand mode. The two-way switch 400 is configured for selectively enabling the first operating portion 50 or the second operating portion 50a. When the first operating portion 50 is enabled, the computer mouse 100 is adapted for right handed use. When the second operating portion 50a is enabled, the computer mouse 100 is adapted for left handed use. When being enabled, the buttons 51 or 51a functions as a left button like a left button of a conventional computer mouse. Similarly, the buttons 52 or 52a functions as a right button like a right button of a conventional computer mouse.

The sliding plate 40 includes a base plate 41, two tabs 42, and two sets of first teeth 43. The two tabs 42 extend through the two sliding slots 12, thus the sliding plate 40 is slidably connected to the cover 10. The two sets of first teeth 43 are formed on the bottom of the two tabs 42.

The base 20 defines a through hole 21, two wheel holes 22, and four axle holes 24. The through hole 21 and the two wheel holes 22 are formed in bottom of the base 20. Two curved grooves 23 and the four axis holes 24 are formed in two opposite sidewalls of the base 20.

The computer mouse 100 further includes a driving mechanism 60, a position detection mechanism 70, and a circuit board 80. The driving mechanism 60 includes two transmission belts 61, two driving wheels 62, two stationary axles 63, and a movable axle 64. The two transmission belts 61 are substantially circular shaped, a section of each transmission belt 61 forms a set of second teeth 65. Each of the two transmission belts 61 coils around one driving wheel 62 and the two stationary axles 63, respectively. Two ends of stationary axle 63 are received in the axis holes 24, mounting the two stationary axles 63 to the base 20. Two ends of the movable axle 64 pass through the two curved grooves 23 and are external to the base 20. The two driving wheels 62 are mounted on the movable axle 64.

The position detection mechanism 70 is used to detect movement of the computer mouse 100 along a support surface (e.g., a desktop), and includes a lens 71, a light emitting member 72 (e.g., a LED), an image sensor 73, and a processing unit 74. The processing unit 74 includes a pair of image processing units 74a and 74b. Functions of the lens 71 and the light emitting member 72 are the same as that of a lens and a light emitting member of a conventional optical computer mouse. The image sensor 73 is configured to capture images of the support surface. The image processing units 74a and 74b are used to process the captured images to determine the moving direction and distance of the computer mouse 100. Data corresponding to the moving direction and distance of the computer mouse 100 are transmitted to a host computer (not shown). A cursor displayed on a screen is then controlled to move based on the data.

In the embodiment, the two-way switch 400 also selectively enables one of the two image processing units 74a and 74b. The orientation of the computer mouse 100 in the left hand mode is opposite to that of the computer mouse 100 in the right hand mode. That is, the computer mouse 100 moves with the buttons 51 and 52 facing forward in the left hand mode, while in the right hand mode it is the buttons 51a and 52a that face backward. To ensure the cursor moves corresponding to the movement of the computer mouse, after switching from the left hand mode to the right hand mode or vice versa, the data collected by the image sensor 73 reflecting the computer mouse 100 moving in a first direction will be processed. The cursor moves in a second direction opposite to the first direction.

The circuit board 80 further includes a controller 81. The controller 81, the left buttons 51 and 51a, the right buttons 52 and 52a the two-way switch 400, and the pair of image processing units 74a and 74b are mounted on the circuit board 80. The two-way switch 400 includes a first sub-switch 44 and a second sub-switch 44a.

Four button holes 11 and two sliding slots 12 are formed in a bottom of the cover 10. Two through holes 13 are formed in sidewalls of the cover 10. The buttons 51, 51a, 52, and 52a extend through the button holes 11 and are external to the cover 10. The wheels 53 and 53a extend through the through holes 13 and are external to the cover 10. The user can thus press the buttons 51, 51a, 52, or 52a to right click or left click, and rotate the wheels 53 or 53a to perform a scroll operation the same as he does with the scroll wheel of a conventional mouse.

The two sets of first teeth 43 are used to engage the second teeth 65 of the transmission belts 61, which cause a rotation of the transmission belts 61, which is converted to the movement of the sliding plate 40.

When the movable axle 64 is positioned at the lower portion of the two curved grooves 23, the two driving wheels 62 extend through the two wheel holes 22 of the base 20, the transmission belts 61 are pressed firmly against the two driving wheels 62 and the two stationary axles 63. When the computer mouse 100 is moved on the desktop, the frictional force moves the transmission belts 61. As the belts 61 move, the sliding plate 40 moves due to the engagement between the first teeth 43 and the second teeth 65, and actuates one of the two sub-switches 44 and 44a.

When the movable axle 64 is positioned at the upper portion of the two curved grooves 23, the two driving wheels 62 are received in the base 20, therefore, the two transmission belts 61 become loose, and cannot drive the sliding plate 40 to slide.

Figure 6:
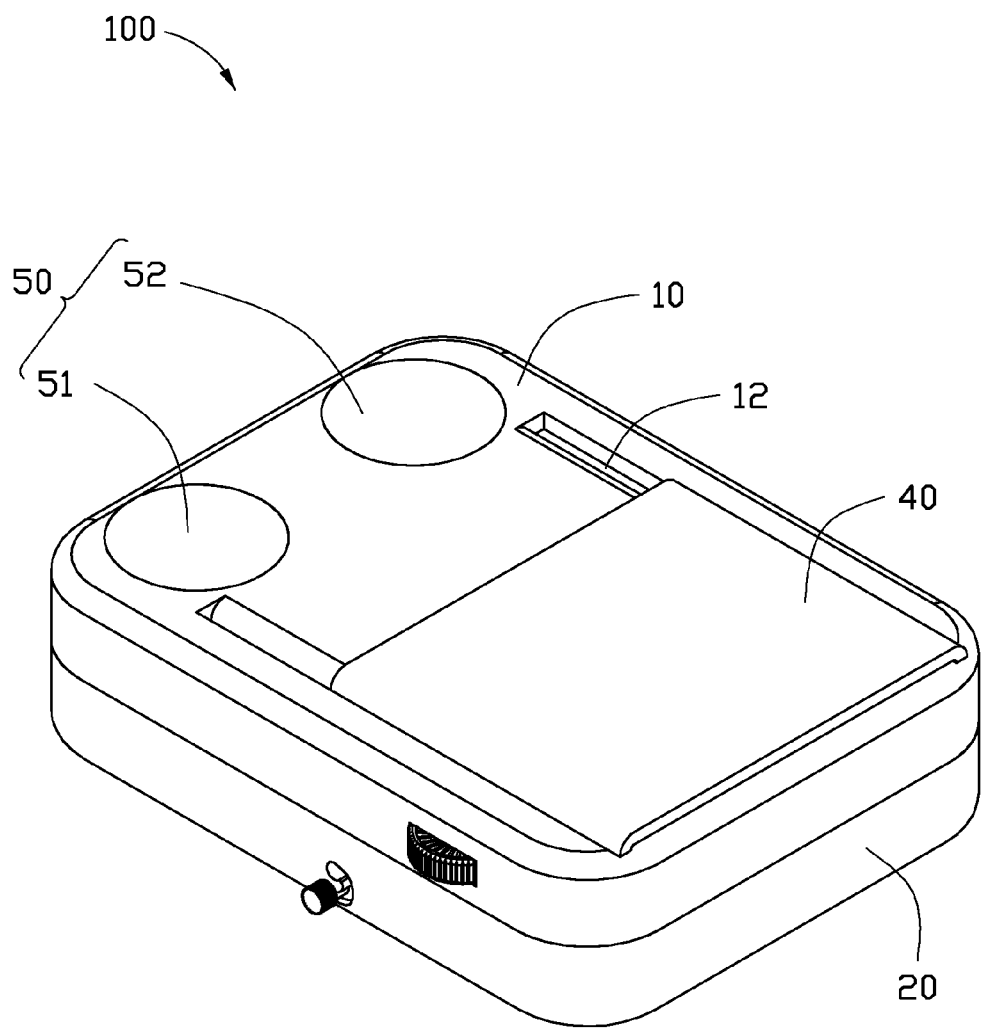
FIG. 6 is an isometric view of a computer mouse of FIG. 1, showing a sliding plate slid to one end of the computer mouse.
Figure 8:
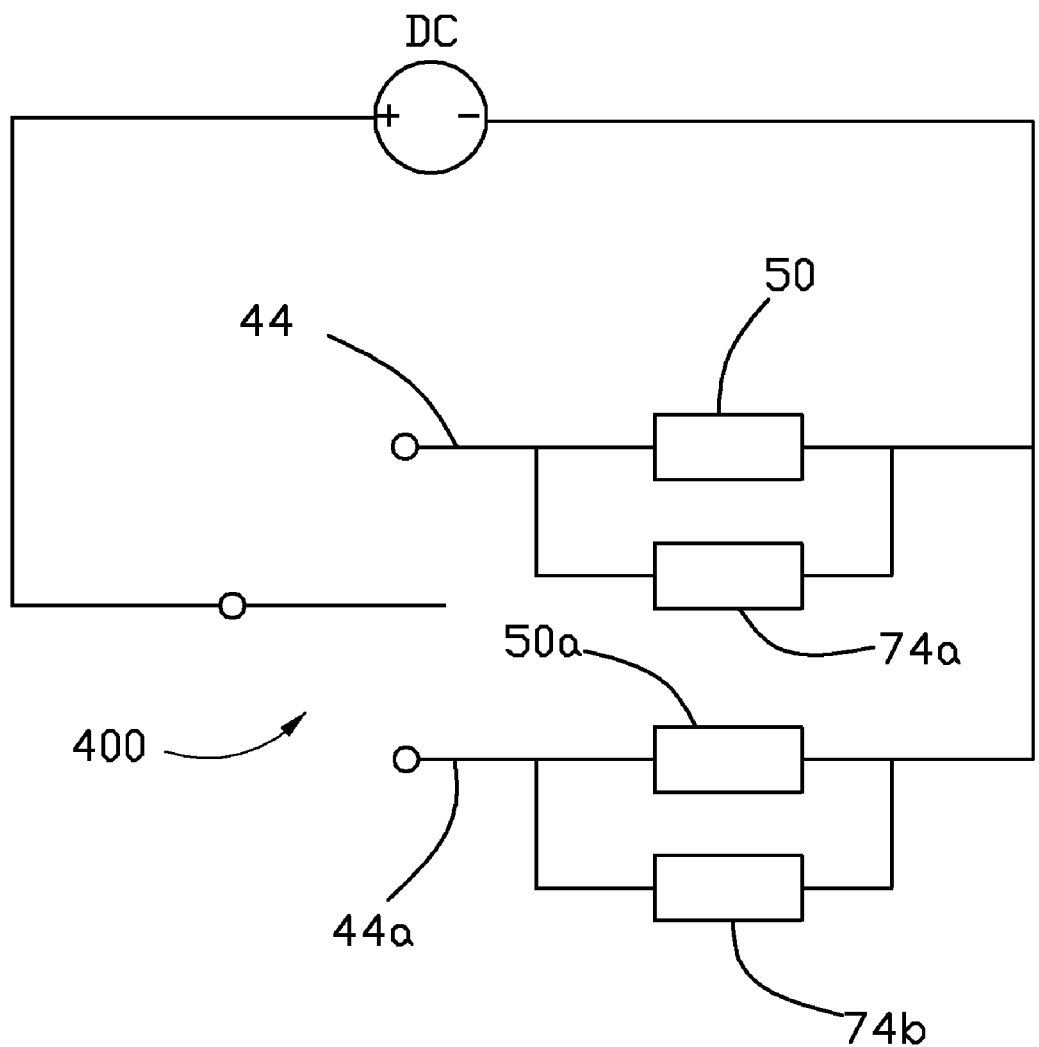
FIG. 8 is a circuit diagram of the computer mouse of FIG. 1.

Referring to FIGS. 6 and 8, the first operating portion 50 and the image processing unit 74a are connected to the first sub-switch 44, the second operating portion 50a and a image processing unit 74b are connected to the second sub-switch 44a.

When slid to an end of the second operating portion 50a, the sliding plate 40 actuates the sub-switches 44, and covers the buttons 51a and 52a, the first operating portion 50 and the image processing unit 74a are enabled. That is, the computer mouse 100 works in a right hand mode.

Figure 7:
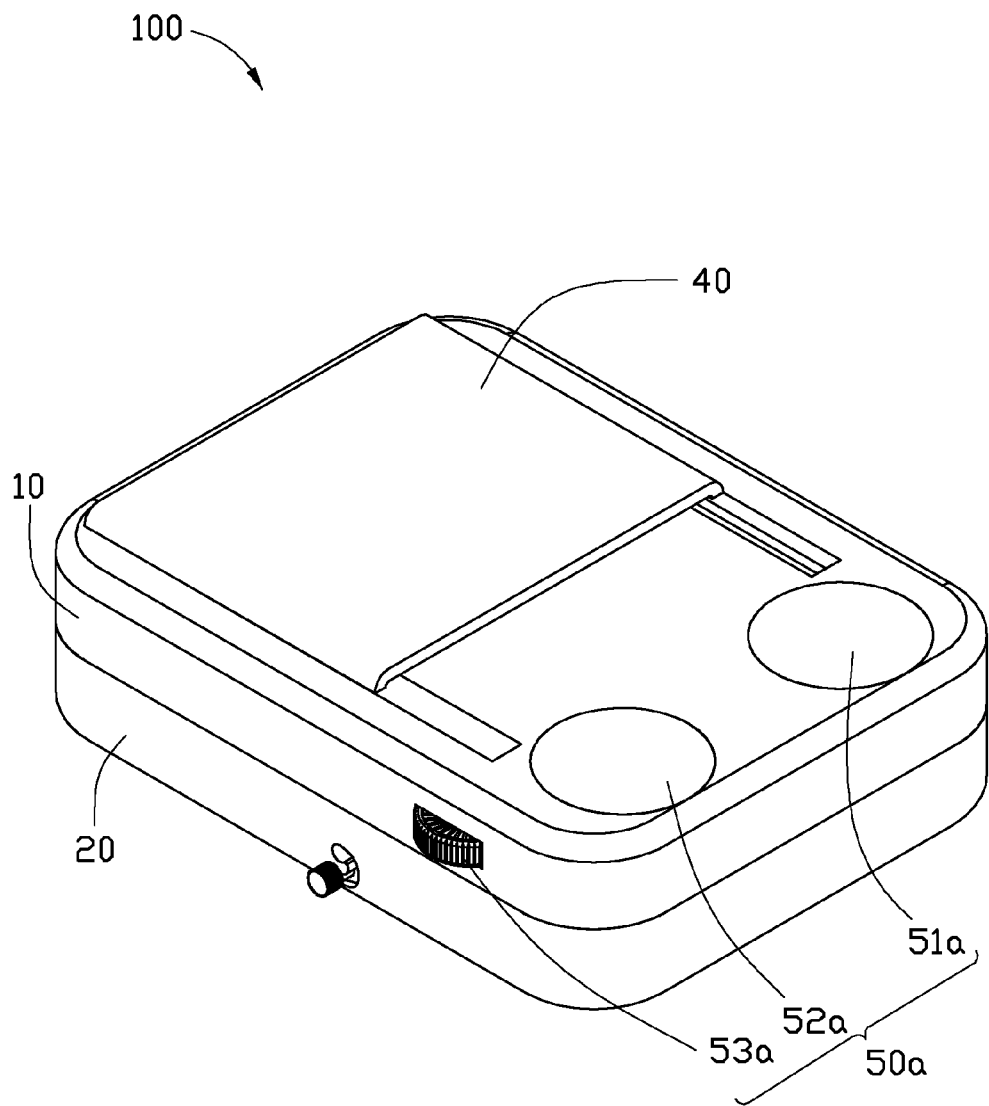
FIG. 7 is another isometric view of a computer mouse of FIG. 1, showing that the sliding plate slid to the opposite end of computer mouse.

Referring to FIGS. 7 and 8, when slid to an end of the second operating portion 50, the sliding plate 40 actuates the second sub-switch 44a, and covers the buttons 51 and 52, the second operating portion 50a and the image processing unit 74b are enabled. That is, the computer mouse 100 is switched to a left hand mode.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A computer mouse comprising:
   a housing;
   a sliding plate being slidably connected to the cover;
   a first sub-switch and a second sub-switch arranged within the housing;
   a first operating portion mounted on one end of the computer mouse;
   a second operating portion mounted on an opposite end of the computer mouse;
   an image sensor configured for capturing images;
   a processing unit arranged within the housing configured for processing the captured images of the image sensor to determine the moving direction and distance of the computer mouse;
   wherein, the first operating portion and the processing unit are connected to the first sub-switch, when the sliding plate sliding to one end of the housing, the first sub-switch is actuated, corresponding the first operating portion and the processing unit are actuated, the computer mouse works in a first mode;
   the second operating portion and the processing unit are connected to the second sub-switch, when the sliding plate sliding to the other end of the housing, the second sub-switch is actuated, corresponding the second operating portion and the processing unit are actuated, and the computer mouse works in a second mode,
   the sliding plate comprises two tabs which extend in the housing, the two tabs forms two sets of first teeth, and
   the computer mouse further comprises a driving mechanism, the driving mechanism comprises two transmission belts, two driving wheels, two stationary axles, and a movable axle, each of the two transmission belts coils around one driving wheel and the two stationary axles respectively, the two driving wheels are mounted on the movable axle, two end of the movable axle are external to the housing, the two transmission belts forms two sets of second teeth, the two sets of first teeth engages to the two sets of second teeth.

2. The computer mouse as described in claim 1, wherein the first operating portion comprises a first left button, a first right button, and a first wheel.

3. The computer mouse as described in claim 1, wherein the second operating portion comprises a second left button, a second right button, and a second wheel.

4. The computer mouse as described in claim 1, further comprising a circuit board, wherein a controller, the left buttons, the right buttons, the first sub-switch, the second sub-switch, and the processing unit are mounted on the circuit board.

5. The computer mouse as described in claim 1, wherein a cover cooperates with a base to form the housing.

6. A computer mouse comprising:
   a housing;
   a sliding plate being slidably connected to the cover;
   a first sub-switch and a second sub-switch arranged within the housing;
   a first operating portion mounted on one end of the computer mouse;
   a second operating portion mounted on an opposite end of the computer mouse;
   an image sensor configured for capturing images;
   a processing unit arranged within the housing configured for processing the captured images of the image sensor to determine the moving direction and distance of the computer mouse;
   wherein, the first operating portion and the processing unit are connected to the first sub-switch, when the sliding plate sliding to one end of the housing, the first sub-switch is actuated, corresponding the first operating portion and the processing unit are actuated, the computer mouse works in a first mode;
   the second operating portion and the processing unit are connected to the second sub-switch, when the sliding plate sliding to the other end of the housing, the second sub-switch is actuated, corresponding the second operating portion and the processing unit are actuated, and the computer mouse works in a second mode, and
   a movable axle is mounted in the housing, and is fixed at a first portion or a second portion, when the movable axle is fixed at the first portion, two driving wheels extend through the housing, when the movable axle is fixed at the second portion, the two driving wheels are received in the housing.

7. The computer mouse as described in claim 6, wherein when the movable axle is fixed at the first portion, and the computer mouse is moved on the support surface, the frictional force moves the transmission belts, as the belts move, the sliding plate moves due to the engagement between the first teeth and the second teeth.

8. The computer mouse as described in claim 6, wherein two wheel holes are formed in bottom of the housing, the two driving wheels extend through the two wheel holes of the housing.

9. The computer mouse as described in claim 6, wherein two curved grooves formed in two opposite sidewalls of the housing, each curved groove comprises two portions respectively, the movable axle is mounted in the two curved grooves, and is positioned at one of the two portions.

* * * * *